(12) United States Patent
Turior et al.

(10) Patent No.: US 11,661,904 B2
(45) Date of Patent: May 30, 2023

(54) CYLINDER COVER FOR INTERNAL COMBUSTION ENGINE

(71) Applicant: FLEETGUARD FILTERS PRIVATE LIMITED, Pune (IN)

(72) Inventors: Rohan Turior, Pune (IN); Satyasheel Milind Borwankar, Pune (IN); Ajay Nehra, Pune (IN); Aditya R Pujari, Pune (IN); Sachin P Shirode, Pune (IN)

(73) Assignee: FLEETGUARD FILTERS PRIVATE LIMITED, Banner Pune (IN)

( * ) Notice: Subject to any disclaimer, the term of this patent is extended or adjusted under 35 U.S.C. 154(b) by 0 days.

(21) Appl. No.: 17/787,606

(22) PCT Filed: Dec. 24, 2020

(86) PCT No.: PCT/IB2020/062452
§ 371 (c)(1),
(2) Date: Jun. 21, 2022

(87) PCT Pub. No.: WO2021/130726
PCT Pub. Date: Jul. 1, 2021

(65) Prior Publication Data
US 2022/0412285 A1     Dec. 29, 2022

(30) Foreign Application Priority Data
Dec. 24, 2019  (IN) .............................. 201921053709

(51) Int. Cl.
*F02B 77/00* (2006.01)
*F02F 7/00* (2006.01)
*F02F 1/24* (2006.01)

(52) U.S. Cl.
CPC ................ *F02F 7/006* (2013.01); *F02F 1/24* (2013.01)

(58) Field of Classification Search
CPC . F02F 7/006; F02F 1/24; Y10T 403/75; F16B 19/1072
USPC ...................................................... 123/195 C
See application file for complete search history.

(56) References Cited

U.S. PATENT DOCUMENTS

| | | | | |
|---|---|---|---|---|
| 4,456,268 A | * | 6/1984 | Penn ....................... | F16B 43/00 |
| | | | | 277/630 |
| 7,255,079 B2 | * | 8/2007 | Tripathy ................. | F02F 7/006 |
| | | | | 267/37.1 |
| 10,773,933 B2 | * | 9/2020 | Bryan ..................... | B66C 23/62 |
| 2008/0295796 A1 | * | 12/2008 | Dunsch ................... | F02F 7/006 |
| | | | | 123/195 C |
| 2011/0005490 A1 | * | 1/2011 | Dunsch ................... | F01L 1/053 |
| | | | | 123/198 E |

(Continued)

*Primary Examiner* — Long T Tran
*Assistant Examiner* — James J Kim

(57) ABSTRACT

Cylinder cover for an internal combustion engine, comprising a cylinder head, a cylinder head cover, an intermediate flange arranged between the cylinder head and the cylinder head cover, a plurality of fasteners for fastening the cylinder head cover and the intermediate flange to the cylinder head. The plurality of fasteners comprising a first fastener having a first head with internal threads, and a first shaft with first external threads, and a second fastener comprising a second head, and a second shaft with second external threads. The first fastener fastens the intermediate flange to the cylinder head and the second fastener fastens the cylinder head cover to the intermediate flange.

9 Claims, 4 Drawing Sheets

(56) References Cited

U.S. PATENT DOCUMENTS

2012/0263556 A1* 10/2012 Pratt .................. F16B 19/1054
411/361
2013/0215381 A1* 8/2013 Raghuprasad ....... G02C 5/2281
411/338

* cited by examiner

CYLINDER COVER FOR INTERNAL COMBUSTION ENGINE

TECHNICAL FIELD

The present disclosure relates generally to an internal combustion engine, and more specifically to a cylinder cover designed for the internal combustion engine.

BACKGROUND

Conventionally, an internal combustion engine comprises a cylinder head and a cylinder head cover. Cylinder head cover accommodates crankcase ventilation system. Typically, an intermediate flange is arranged between the cylinder head and the cylinder head cover. The intermediate flange basically provides space and protection for some intermediate components of the internal combustion engine. For example, intermediate components comprise constituents of a fuel injection system and/or components of an ignition system.

A normal life-cycle of the intermediate components requires regular maintenance for prolonged life with stable and efficient operation. This regular maintenance requirement makes the design of cylinder cover in two pieces (i.e. cylinder cover with the intermediate flange) very beneficial for users. But, making the cylinder cover in two pieces also poses a technical threat of increased mechanical vibrations affecting both pieces.

The intermediate components accommodated inside the intermediate flange and cylinder cover are naturally prone to mechanical vibrations being propagated via the cylinder head. These mechanical vibrations even affect the regular maintenance as regular tuning of the fuel injection system and/or the ignition system is required more often than systems not affected/isolated from these mechanical vibrations.

DE4009017 discloses an internal combustion engine having an intermediate flange. EP2546504B1 discloses a singular collar fastener with a design reducing mechanical vibrations and connecting the cylinder cover and the intermediate flange to the cylinder head.

The present invention deals with the internal combustion engine having the above-mentioned shortcomings and provides an improved and alternative embodiment ensuring reduced vibration exposure of the intermediate flange and the components housed therein.

SUMMARY

Embodiments of the present disclosure present technological improvements as solutions to one or more of the above-mentioned technical problems recognized by the inventor in conventional systems.

In an aspect of the present disclosure, an internal combustion engine is provided. The internal combustion engine comprises a cylinder head, a cylinder head cover, an intermediate flange arranged between the cylinder head and the cylinder head cover, and a plurality of fasteners for fastening the cylinder head cover and the intermediate flange to the cylinder head.

In an aspect of the present disclosure, the plurality of fasteners comprises a first fastener and a second fastener. The first fastener comprises a first head with internal threads and a first shaft with first external threads. The second fastener comprises a second head and a second shaft with second external threads. In an alternate embodiment of the present disclosure, the first fastener comprises only the first shaft and includes the internal threads fully within the first shaft of the first fastener, situated on an end opposite to the end having the first external threads. These internal threads integrated within the first shaft replace the need for having the first head. In another alternate embodiment of the present disclosure, the second fastener comprises only the second shaft and includes a drive recess fully within the second shaft of the second fastener, situated on an end opposite to the end having the second external threads. This drive recess acts as tightening means for the second fastener and replaces the need for having the second head. It must be noted that the term fastener is used to represent tightening means and other similar modifications such as a bolt or a traditional fastener with a head and a shaft are possible fastener.

According to aspects of the present disclosure, the first fastener fastens the intermediate flange to the cylinder head such that the first external threads of the first shaft mate with the cylinder head and the first head rests on the intermediate flange. Further, the second fastener fastens the cylinder head cover to the intermediate flange such that the second external threads of the second shaft mate with the internal threads of the first fastener and the second head rests on the cylinder head cover.

In another aspect, the first head of the first fastener rests directly on the intermediate flange and the second head of the second fastener rests directly on the cylinder head cover.

In an aspect of the present disclosure, a first opening extends from the intermediate flange into the cylinder head for receiving the first fastener. The first opening is shaped in the intermediate flange to receive the first head of the first fastener and the first opening is shaped in the cylinder head to receive the first external threads of the first shaft of the first fastener. Further, the first opening comprises a head opening shaped to receive the first head of the first fastener and a shaft opening shaped to receive the first shaft of the first fastener.

In another aspect, a second opening is provided in the cylinder head cover for receiving the second shaft of the second fastener.

In yet another aspect, an internal combustion engine having a two piece cylinder cover with reduced exposure to mechanical vibrations is provided.

Additional aspects, advantages, features and objects of the present disclosure would be made apparent from the drawings and the detailed description of the illustrative embodiments.

It will be appreciated that features of the present disclosure are susceptible to being combined in various combinations without departing from the scope of the present disclosure as defined by the below mentioned detailed description and drawings.

BRIEF DESCRIPTION OF THE ACCOMPANYING DRAWINGS

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 4:
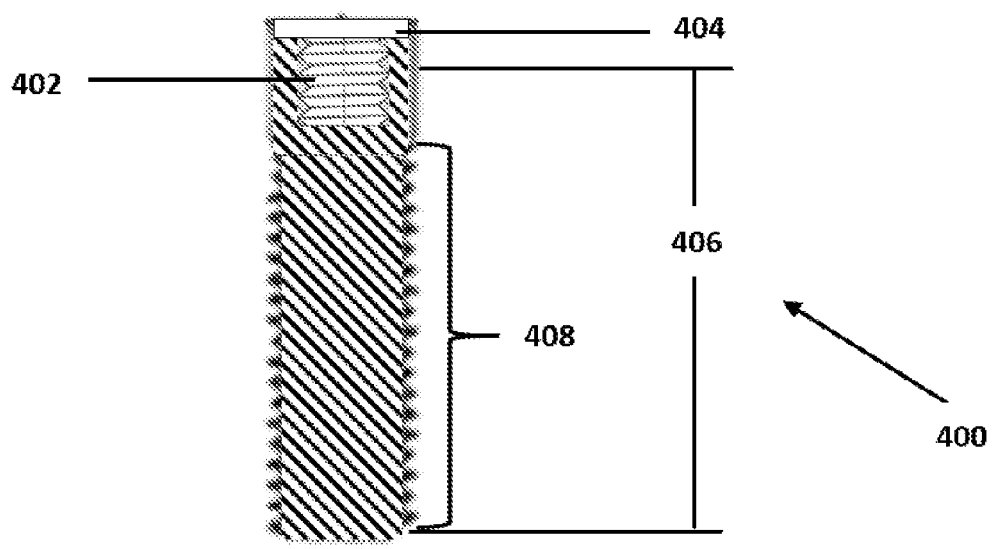

FIG. 4 depicts the front sectional view of a fastener as per a second embodiment of the present invention In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and manners by which they can be implemented. Although some modes of carrying out the present disclosure has been disclosed, those skilled in the art would recognize that other embodiments for carrying out or practicing the present disclosure are also possible. The person skilled in the art will recognize many variations, alternatives, and modifications of the embodiments of the present disclosure. It should be understood that this invention is not limited to the particular methodology, protocols, and the like, described herein and as such may vary. The terminology used herein is for the purpose of describing particular embodiments only and is not intended to limit the scope of the present invention, which is defined solely by the claims.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments of the aspects described herein, and are not intended to limit the claimed invention, because the scope of the invention is limited only by the claims. Further, unless otherwise required by context, singular terms shall include pluralities and plural terms shall include the singular.

As used herein, the term "comprising" or "comprises" is used in reference to compositions, methods, and respective component(s) thereof, that are essential to the invention, yet open to the inclusion of unspecified elements, whether essential or not.

The singular terms "a", "an", and "the" include plural references unless the context clearly indicates otherwise. Similarly, the word "or" is intended to include "and" unless the context clearly indicates otherwise. Thus, for example, references to the "method" includes one or more methods, and/or steps of the type described herein, and/or which will become apparent to those persons skilled in the art upon reading this disclosure and so forth.

Although methods and materials similar or equivalent to those described herein can be used in the practice or testing of this disclosure, suitable methods and materials are described below. The term "comprises" means "includes". The abbreviation, "e.g." is derived from the Latin exempli gratia and is used herein to indicate a non-limiting example. Thus, the abbreviation "e.g." is synonymous with the term "for example".

In an aspect of the present disclosure, an internal combustion engine is provided. The internal combustion engine comprises a cylinder head, a cylinder head cover, an intermediate flange arranged between the cylinder head and the cylinder head cover, and a plurality of fasteners for fastening the cylinder head cover and the intermediate flange to the cylinder head.

In an aspect of the present disclosure, the plurality of fasteners comprises a first fastener and a second fastener. The first fastener comprises a first head with internal threads and a first shaft with first external threads. The second fastener comprises a second head and a second shaft with second external threads. In an alternate embodiment of the present disclosure, the first fastener comprises only the first shaft and includes the internal threads fully within the first shaft of the first fastener, situated on an end opposite to the end having the first external threads. These internal threads integrated within the first shaft replace the need for having the first head. In another alternate embodiment of the present disclosure, the second fastener comprises only the second shaft and includes a drive recess fully within the second shaft of the second fastener, situated on an end opposite to the end having the second external threads. The drive recess acts as tightening means for the second fastener and replaces the need for having the second head. It must be noted that the term fastener is used to represent tightening means and other similar modifications are possible in a traditional fastener with a head and a shaft.

According to aspects of the present disclosure, the first fastener fastens the intermediate flange to the cylinder head such that the first external threads of the first shaft mate with the cylinder head and the first head rests on the intermediate flange. Further, the second fastener fastens the cylinder head cover to the intermediate flange such that the second external threads of the second shaft mate with the internal threads of the first fastener and the second head rests on the cylinder head cover.

In another aspect, the first head of the first fastener rests directly on the intermediate flange and the second head of the second fastener rests directly on the cylinder head cover.

In an aspect of the present disclosure, a first opening extends from the intermediate flange into the cylinder head for receiving the first fastener. The first opening is shaped in the intermediate flange to receive the first head of the first fastener and the first opening is shaped in the cylinder head to receive the first external threads of the first shaft of the first fastener. Further, the first opening comprises a head opening shaped to receive the first head of the first fastener and a shaft opening shaped to receive the first shaft of the first fastener.

In another aspect, a second opening is provided in the cylinder head cover for receiving the second shaft of the second fastener Embodiments of the present disclosure substantially eliminate, or at least partially address, problems in the prior art, and assist the internal combustion engine manufacturers, consumers, and suppliers.

Figure 1:
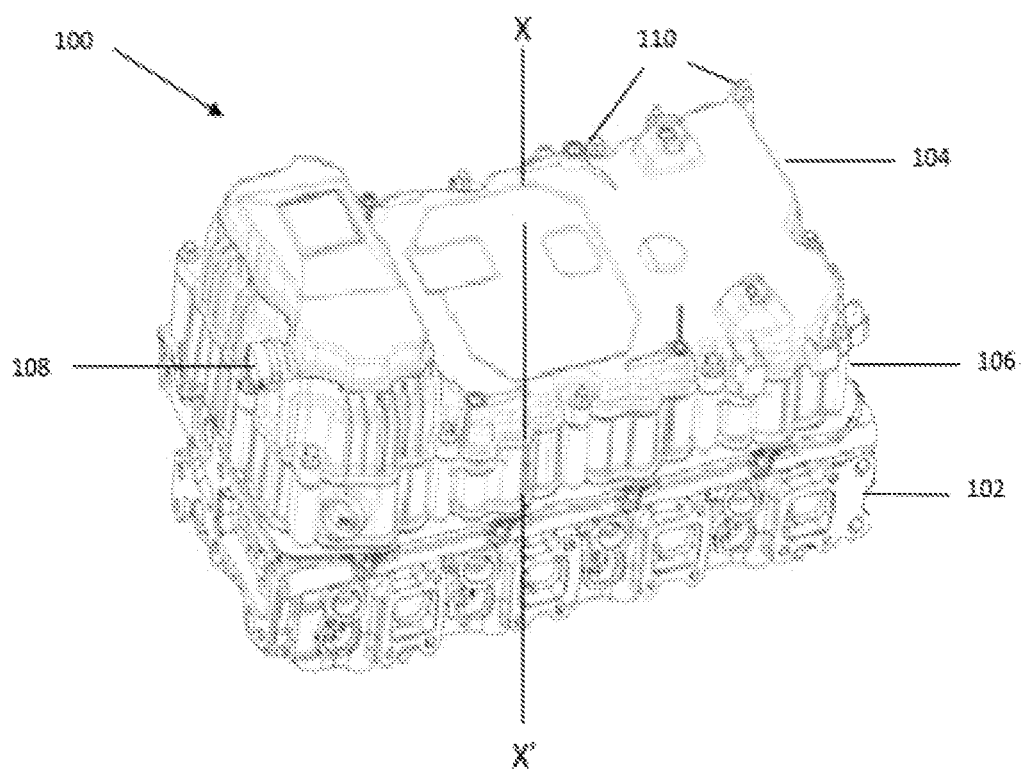
FIG. 1 is a perspective view depicting a partial region of an internal combustion engine, in accordance with an exemplary embodiment of the present disclosure.

Referring now to the drawings, particularly by their reference numbers, FIG. 1 illustrates an internal combustion engine 100 depicted only partially in a perspective view, in accordance with an embodiment of the present disclosure. The internal combustion engine 100 includes a cylinder head 102, a cylinder head cover 104, and an intermediate flange 106. In an embodiment, the cylinder head cover 104 includes an outlet 108 for crankcase ventilation system (not shown) of the internal combustion engine 100.

As may be seen, the intermediate flange 106 is positioned between the cylinder head 102 and the cylinder head cover 104. In an embodiment, the intermediate flange 106 provides space for arranging constituents of a fuel injection system (not shown) and/or components of an ignition system (not shown). The cylinder head 102, the cylinder head cover 104, and the intermediate flange 106 are mounted along a direction X-X'.

In an aspect of the present disclosure, a plurality of fasteners 110 are provided to fasten the cylinder head cover 104 and the intermediate flange 106 to the cylinder head 102 and are arranged parallel to the direction X-X'. As illustrated, the plurality of fasteners 110 are arranged along the circumferential contour of the cylinder head cover 104 and the intermediate flange 106.

FIG. 1 is merely an example. A person skilled in the art will recognize many variations, alternatives, and modifications of the embodiments of the present disclosure.

Figure 2:
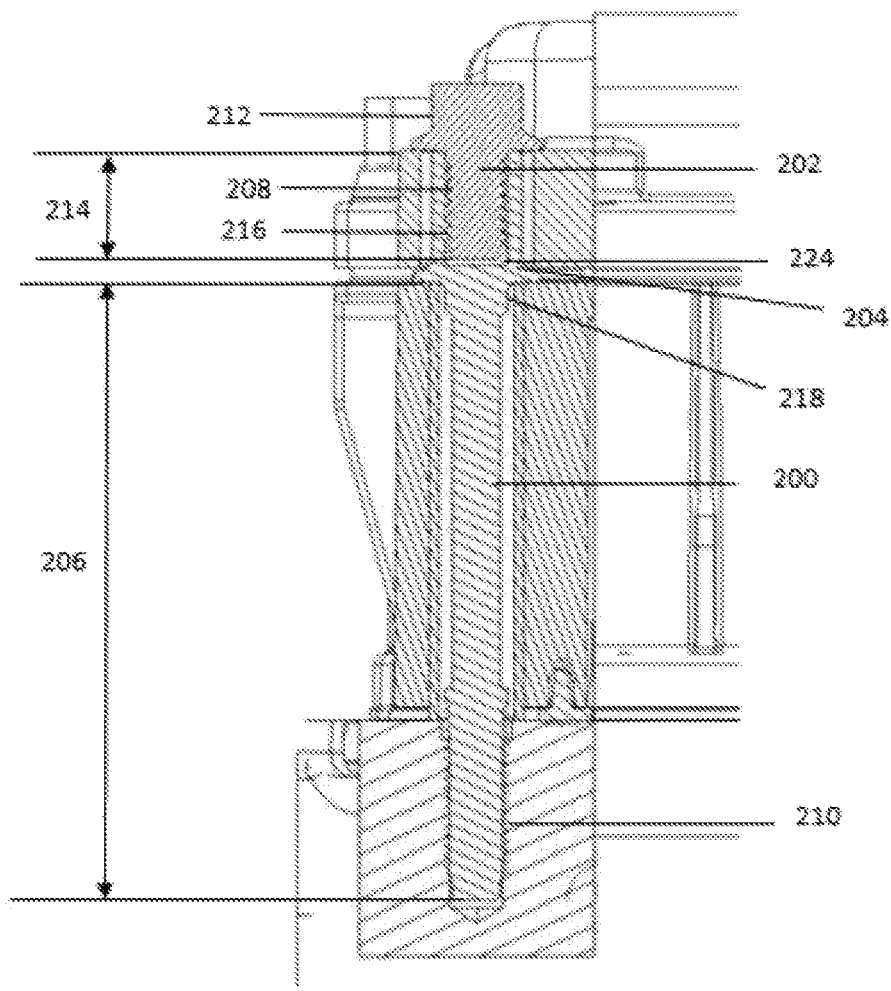
FIG. 2 depicts a front cross-sectional view of the partial region of the internal combustion engine of FIG. 1, in accordance with another exemplary embodiment of the present disclosure.

FIG. 2 depicts a front cross-sectional view of the internal combustion engine 100 depicted in FIG. 1. As illustrated in the view, the plurality of fasteners 110 comprises a first fastener 200 and a second fastener 202. As may be further seen, the first fastener 200 fastens the intermediate flange 106 to the cylinder head 102 and the second fastener 202 fastens the cylinder head cover 104 to the intermediate flange 106. In an embodiment of the present disclosure, the first fastener 200 and the second fastener 202 have both internal and external threads.

According to embodiments of the present disclosure, the first fastener 200 comprises a first head 204 and a first shaft 206. As illustrated, the first head 204 includes internal threads 208 provided for receiving the second fastener 202. The first shaft 206 includes first external threads 210 provided to be fastened to the cylinder head 102. In an alternate embodiment of the present disclosure, the first fastener 200 comprises only the first shaft 206 and includes the internal threads 208 fully within the first shaft 206 of the first fastener 200, situated on an end opposite to the end having the first external threads 210. These internal threads 208 integrated within the first shaft 206 replace the need for having the first head 204. It must be noted that the term fastener is used to represent tightening means and other similar modifications are possible in a traditional fastener with a head and a shaft.

Further, the second fastener 202 comprises a second head 212 and a second shaft 214. As depicted, the second head 212 is made in such a manner that it completely rests on the cylinder head cover 104 after fully tightening the second fastener 202. The second shaft 214 includes second external threads 216 provided for mating with the internal threads 208 of the first fastener 200. In an alternate embodiment of the present disclosure, the second fastener 202 comprises only the second shaft 214 and includes a drive recess (not shown) on an end opposite to the end having the second external threads 216. The drive recess (not shown) acts as tightening means for the second fastener 202 and replaces the need for having the second head 212. It must be noted that the term fastener is used to represent tightening means and other similar modifications are possible in a traditional fastener with a head and a shaft.

Further referring to FIG. 2, a first opening 218 is provided in the intermediate flange 106 and extends parallel to the X-X' direction into the cylinder head 102. In an embodiment of the present disclosure, the first opening 218 is shaped in such a manner that it receives the first head 204 and the first shaft 206 of the first fastener 200. In another embodiment of the present disclosure, the first opening 218 includes a head opening 220 and a shaft opening 222. As illustrated, the head opening 220 is shaped to receive the first head 204 of the first fastener 200 and the shaft opening 222 is shaped to receive the first shaft 206 of the first fastener 200. In an embodiment, the head opening 220 is shaped in such a manner such that it may receive a seal (not shown) around the first head 204.

Referring again to FIG. 2, a second opening 224 is provided in the cylinder head cover 104 and extends parallel to the X-X' direction up to the head groove 220 in the intermediate flange 106. In an embodiment of the present disclosure, the second opening 224 is shaped in such a manner that it receives the second shaft 214 of the second fastener 202.

Figure 3:
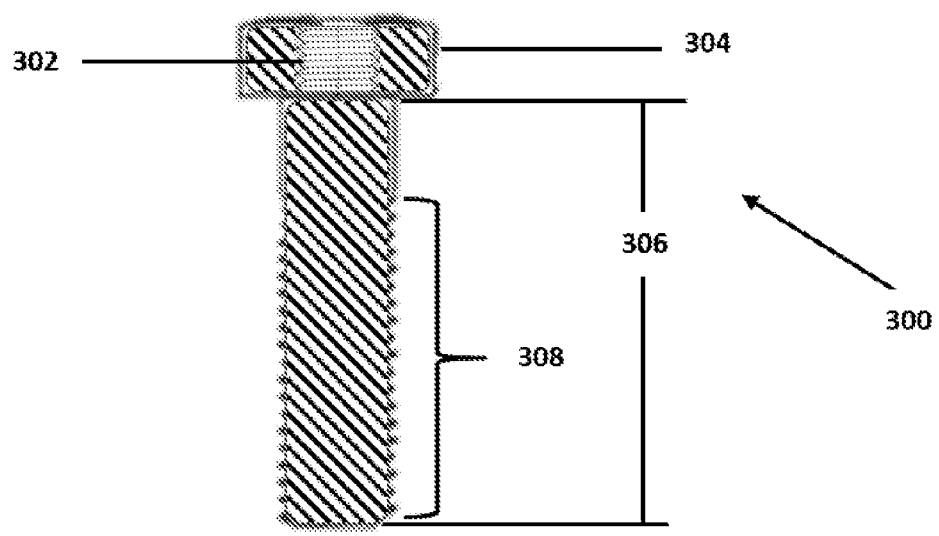
FIG. 3 depicts the front sectional view of a fastener as per an embodiment of the present invention.

In an embodiment of the present invention fastener may be a bolt with a head having threaded internal groove formed within the head of the bolt. FIG. 3 shows one such bolt 300 as per an embodiment of the invention. The bolt 300 has a head 304, a threaded portion 302 formed within the head 304, shaft 306 and a threaded portion of the shaft 308. The threaded portion 308 of the shaft 306 fastens the bolt 300 onto a threaded portion in the cylinder head 102, and the threaded portion 302 of the fastener 300 received a threaded portion of a second fastener 202. Thus, the cylinder head cover 104 and the and the intermediate flange 106 are securely fastened onto the cylinder head 102 via the bolt 300 and second fastener 202.

In an alternate embodiment of the present disclosure, the fastener may be a screw comprising a first shaft having internal threads within and the first shaft the first screw, situated on an end opposite to the internal threads the shaft has a first external threads. FIG. 4 shows one such screw 400 having a shaft 406, drive recess 404 formed on one end of the shaft 406, an internal threaded portion 402 formed on the same end as the recess 404 and an external threaded portion 408 formed on an opposite portion of the shaft 406. The drive recess 404, is used to drive the threaded portion 408 of the shaft 406 onto a threaded portion of the cylinder head 102 such that the screw 400 is securely fastened onto the cylinder head 102. The internal threaded portion 402 of the screw 400 is adapted to receive the second fastener 202 such that the cylinder head cover 104 is securely fastened onto the cylinder head 102 via the screw 400. Thus, the cylinder head cover 104 and the and the intermediate flange 106 are securely fastened onto the cylinder head 102 via the screw 400 and second fastener 202. FIG. 2 is merely an example. A person skilled in the art will recognize many variations, alternatives, and modifications of the embodiments of the present disclosure.

Embodiments of the present disclosure can be used for various purposes, including, though not limited to, manufacturing and servicing of the internal combustion engines.

Modifications to various embodiments of the present disclosure described in the foregoing are possible without departing from the scope of the present disclosure as defined by the accompanying claims. Expressions such as "including", "comprising", "incorporating". "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An internal combustion engine comprising:
   a cylinder head;
   a cylinder head cover;
   an intermediate flange arranged between the cylinder head and the cylinder head cover;
   a plurality of fasteners for fastening the cylinder head cover and the intermediate flange to the cylinder head, the plurality of fasteners comprising:
      a first fastener, the first fastener comprising a first head with internal threads, and a first shaft with first external threads; and
      a second fastener, the second fastener comprising a second head, and a second shaft with second external threads; characterized in that:
      the first fastener fastens the intermediate flange to the cylinder head such that the first external threads of the first shaft mate with the cylinder head and the first head rests on the intermediate flange;
      the second fastener fastens the cylinder head cover to the intermediate flange such that the second external threads of the second shaft mate with the internal threads of the first fastener and the second head rests on the cylinder head cover.

2. The internal combustion engine as claimed in claim 1, wherein the first head of the first fastener rests directly on the intermediate flange.

3. The internal combustion engine as claimed in claim 1, wherein the second head of the second fastener rests directly on the cylinder head cover.

4. The internal combustion engine as claimed in claim 1, wherein a first opening extends from the intermediate flange into the cylinder head for receiving the first fastener.

5. The internal combustion engine as claimed in claim 4, wherein the first opening is shaped in the intermediate flange to receive the first head of the first fastener, and the first opening is shaped in the cylinder head to receive the first external threads of the first shaft of the first fastener.

6. The internal combustion engine as claimed in claim 4, wherein the first opening comprises a head opening shaped to receive the first head of the first fastener and a shaft opening shaped to receive the first shaft of the first fastener.

7. The internal combustion engine as claimed in claim 1, wherein a second opening is provided in the cylinder head cover for receiving the second shaft of the second fastener.

8. The internal combustion engine as claimed in claim 1, wherein the first fastener comprises only a first shaft including internal threads on one end of the first shaft and the first external threads on the opposite end of the first shaft.

9. The internal combustion engine as claimed in claim 1, wherein the second fastener comprises only a second shaft with a drive recess on an end opposite to the end having the second external threads.

* * * * *